US012589303B2

(12) United States Patent
Kohler et al.

(10) Patent No.: US 12,589,303 B2
(45) Date of Patent: Mar. 31, 2026

(54) COMPUTER-IMPLEMENTED METHODS FOR GENERATING LEVEL OF DETAIL ASSETS FOR DYNAMIC RENDERING DURING A VIDEOGAME SESSION

(71) Applicant: Activision Publishing, Inc., Santa Monica, CA (US)

(72) Inventors: Johan Kohler, Santa Monica, CA (US); Josiah Michael Bartoszek Manson, Seattle, WA (US)

(73) Assignee: Activision Publishing, Inc., Santa Monica, CA (US)

( * ) Notice: Subject to any disclaimer, the term of this patent is extended or adjusted under 35 U.S.C. 154(b) by 554 days.

(21) Appl. No.: 18/053,828

(22) Filed: Nov. 9, 2022

(65) Prior Publication Data

US 2023/0149813 A1 May 18, 2023

Related U.S. Application Data

(60) Provisional application No. 63/263,974, filed on Nov. 12, 2021.

(51) Int. Cl.
| | |
|---|---|
| *A63F 13/53* | (2014.01) |
| *A63F 13/52* | (2014.01) |
| *A63F 13/537* | (2014.01) |
| *G06T 5/00* | (2024.01) |

(Continued)

(52) U.S. Cl.
CPC ............ *A63F 13/537* (2014.09); *A63F 13/52* (2014.09); *G06T 17/20* (2013.01); *A63F 2300/303* (2013.01); *A63F 2300/6615* (2013.01)

(58) Field of Classification Search
CPC .. A63F 13/537; A63F 13/52; A63F 2300/303; A63F 2300/6615; G06T 17/20; G06T 17/05; G06T 15/04; G06T 5/00–5/08; G06T 7/40; G06T 7/60; G06T 15/003–15/20; G06T 19/00; G06T 19/20; G06T 2210/36; G06T 2210/52;

(Continued)

(56) References Cited

U.S. PATENT DOCUMENTS

| | | | |
|---|---|---|---|
| 5,530,796 A | 6/1996 | Wang |
| 5,561,736 A | 10/1996 | Moore |
| 5,563,946 A | 10/1996 | Cooper |

(Continued)

FOREIGN PATENT DOCUMENTS

| | | |
|---|---|---|
| AU | 768367 | 3/2004 |
| AU | 2005215048 | 10/2011 |

(Continued)

OTHER PUBLICATIONS

Erikson, "Hierarchical Levels of Detail to Accelerate the Rendering of Large Static and Dynamic Polygonal Environments" University of NC Chapel Hill 2000 (Year: 2000).

(Continued)

*Primary Examiner* — Wesner Sajous
(74) *Attorney, Agent, or Firm* — Novel IP

(57) ABSTRACT

The present specification discloses systems and methods of creating a point cloud around a portion of a virtual landscape of a video game. A mesh is generated based on the point cloud, and then the mesh is simplified to create a series of proxy meshes that are dynamically used to render level of detail (LOD) visual assets.

19 Claims, 10 Drawing Sheets

(51) Int. Cl.
   *G06T 17/05*          (2011.01)
   *G06T 17/20*          (2006.01)
(58) Field of Classification Search
   CPC . G06T 2207/10028; G06T 2207/10052; G06T
                      2210/00; G06V 20/10
   See application file for complete search history.

(56)                References Cited

U.S. PATENT DOCUMENTS

| | | | |
|---|---|---|---|
| 5,685,775 | A | 11/1997 | Bakoglu |
| 5,706,507 | A | 1/1998 | Schloss |
| 5,708,764 | A | 1/1998 | Borrel |
| 5,736,985 | A | 4/1998 | Lection |
| 5,737,416 | A | 4/1998 | Cooper |
| 5,745,678 | A | 4/1998 | Herzberg |
| 5,764,232 | A | 6/1998 | Oouchi |
| 5,768,511 | A | 6/1998 | Galvin |
| 5,825,877 | A | 10/1998 | Dan |
| 5,835,692 | A | 11/1998 | Cragun |
| 5,878,233 | A | 3/1999 | Schloss |
| 5,883,628 | A | 3/1999 | Mullaly |
| 5,900,879 | A | 5/1999 | Berry |
| 5,903,266 | A | 5/1999 | Berstis |
| 5,903,271 | A | 5/1999 | Bardon |
| 5,911,045 | A | 6/1999 | Leyba |
| 5,920,325 | A | 7/1999 | Morgan |
| 5,923,324 | A | 7/1999 | Berry |
| 5,969,724 | A | 10/1999 | Berry |
| 5,977,979 | A | 11/1999 | Clough |
| 5,990,888 | A | 11/1999 | Blades |
| 6,014,145 | A | 1/2000 | Bardon |
| 6,025,839 | A | 2/2000 | Schell |
| 6,059,842 | A | 5/2000 | Dumarot |
| 6,069,632 | A | 5/2000 | Mullaly |
| 6,081,270 | A | 6/2000 | Berry |
| 6,081,271 | A | 6/2000 | Bardon |
| 6,091,410 | A | 7/2000 | Lection |
| 6,094,196 | A | 7/2000 | Berry |
| 6,098,056 | A | 8/2000 | Rusnak |
| 6,104,406 | A | 8/2000 | Berry |
| 6,111,581 | A | 8/2000 | Berry |
| 6,134,588 | A | 10/2000 | Guenthner |
| 6,144,381 | A | 11/2000 | Lection |
| 6,148,328 | A | 11/2000 | Cuomo |
| 6,185,614 | B1 | 2/2001 | Cuomo |
| 6,201,881 | B1 | 3/2001 | Masuda |
| 6,222,551 | B1 | 4/2001 | Schneider |
| 6,271,842 | B1 | 8/2001 | Bardon |
| 6,271,843 | B1 | 8/2001 | Lection |
| 6,282,547 | B1 | 8/2001 | Hirsch |
| 6,311,206 | B1 | 10/2001 | Malkin |
| 6,334,141 | B1 | 12/2001 | Varma |
| 6,336,134 | B1 | 1/2002 | Varma |
| 6,337,700 | B1 | 1/2002 | Kinoe |
| 6,353,449 | B1 | 3/2002 | Gregg |
| 6,356,297 | B1 | 3/2002 | Cheng |
| 6,411,312 | B1 | 6/2002 | Sheppard |
| 6,421,051 | B1 | 7/2002 | Kato |
| 6,426,750 | B1 | 7/2002 | Hoppe |
| 6,426,757 | B1 | 7/2002 | Smith |
| 6,445,389 | B1 | 9/2002 | Bossen |
| 6,452,593 | B1 | 9/2002 | Challener |
| 6,462,760 | B1 | 10/2002 | Cox, Jr. |
| 6,469,712 | B1 | 10/2002 | Hilpert, Jr. |
| 6,473,085 | B1 | 10/2002 | Brock |
| 6,499,053 | B1 | 12/2002 | Marquette |
| 6,505,208 | B1 | 1/2003 | Kanevsky |
| 6,525,731 | B1 | 2/2003 | Suits |
| 6,549,933 | B1 | 4/2003 | Barrett |
| 6,567,109 | B1 | 5/2003 | Todd |
| 6,618,751 | B1 | 9/2003 | Challenger |
| RE38,375 | E | 12/2003 | Herzberg |
| 6,657,617 | B2 | 12/2003 | Paolini |
| 6,657,642 | B1 | 12/2003 | Bardon |
| 6,684,255 | B1 | 1/2004 | Martin |
| 6,717,600 | B2 | 4/2004 | Dutta |
| 6,734,884 | B1 | 5/2004 | Berry |
| 6,765,574 | B1 | 7/2004 | Mao |
| 6,765,596 | B2 | 7/2004 | Lection |
| 6,781,607 | B1 | 8/2004 | Benham |
| 6,819,669 | B2 | 11/2004 | Rooney |
| 6,832,239 | B1 | 12/2004 | Kraft |
| 6,836,480 | B2 | 12/2004 | Basso |
| 6,886,026 | B1 | 4/2005 | Hanson |
| 6,948,168 | B1 | 9/2005 | Kuprionas |
| RE38,865 | E | 11/2005 | Dumarot |
| 6,993,596 | B2 | 1/2006 | Hinton |
| 7,028,296 | B2 | 4/2006 | Irfan |
| 7,062,533 | B2 | 6/2006 | Brown |
| 7,143,409 | B2 | 11/2006 | Herrero |
| 7,209,137 | B2 | 4/2007 | Brokenshire |
| 7,230,616 | B2 | 6/2007 | Taubin |
| 7,249,123 | B2 | 7/2007 | Elder |
| 7,263,511 | B2 | 8/2007 | Bodin |
| 7,287,053 | B2 | 10/2007 | Bodin |
| 7,305,438 | B2 | 12/2007 | Christensen |
| 7,308,476 | B2 | 12/2007 | Mannaru |
| 7,404,149 | B2 | 7/2008 | Fox |
| 7,426,538 | B2 | 9/2008 | Bodin |
| 7,427,980 | B1 | 9/2008 | Partridge |
| 7,428,588 | B2 | 9/2008 | Berstis |
| 7,429,987 | B2 | 9/2008 | Leah |
| 7,436,407 | B2 | 10/2008 | Doi |
| 7,439,975 | B2 | 10/2008 | Hsu |
| 7,443,393 | B2 | 10/2008 | Shen |
| 7,447,996 | B1 | 11/2008 | Cox |
| 7,467,181 | B2 | 12/2008 | McGowan |
| 7,475,354 | B2 | 1/2009 | Guido |
| 7,478,127 | B2 | 1/2009 | Creamer |
| 7,484,012 | B2 | 1/2009 | Hinton |
| 7,503,007 | B2 | 3/2009 | Goodman |
| 7,506,264 | B2 | 3/2009 | Polan |
| 7,515,136 | B1 | 4/2009 | Kanevsky |
| 7,525,964 | B2 | 4/2009 | Astley |
| 7,552,177 | B2 | 6/2009 | Kessen |
| 7,565,650 | B2 | 7/2009 | Bhogal |
| 7,571,224 | B2 | 8/2009 | Childress |
| 7,571,389 | B2 | 8/2009 | Broussard |
| 7,580,888 | B2 | 8/2009 | Ur |
| 7,596,596 | B2 | 9/2009 | Chen |
| 7,640,587 | B2 | 12/2009 | Fox |
| 7,667,701 | B2 | 2/2010 | Leah |
| 7,698,656 | B2 | 4/2010 | Srivastava |
| 7,702,784 | B2 | 4/2010 | Berstis |
| 7,714,867 | B2 | 5/2010 | Doi |
| 7,719,532 | B2 | 5/2010 | Schardt |
| 7,719,535 | B2 | 5/2010 | Tadokoro |
| 7,734,691 | B2 | 6/2010 | Creamer |
| 7,737,969 | B2 | 6/2010 | Shen |
| 7,743,095 | B2 | 6/2010 | Goldberg |
| 7,747,679 | B2 | 6/2010 | Galvin |
| 7,765,478 | B2 | 7/2010 | Reed |
| 7,768,514 | B2 | 8/2010 | Pagan |
| 7,773,087 | B2 | 8/2010 | Fowler |
| 7,774,407 | B2 | 8/2010 | Daly |
| 7,782,318 | B2 | 8/2010 | Shearer |
| 7,792,263 | B2 | 9/2010 | Bruce |
| 7,792,801 | B2 | 9/2010 | Hamilton, II |
| 7,796,128 | B2 | 9/2010 | Radzikowski |
| 7,808,500 | B2 | 10/2010 | Shearer |
| 7,814,152 | B2 | 10/2010 | McGowan |
| 7,827,318 | B2 | 11/2010 | Hinton |
| 7,843,471 | B2 | 11/2010 | Doan |
| 7,844,663 | B2 | 11/2010 | Boutboul |
| 7,847,799 | B2 | 12/2010 | Taubin |
| 7,856,469 | B2 | 12/2010 | Chen |
| 7,873,485 | B2 | 1/2011 | Castelli |
| 7,882,222 | B2 | 2/2011 | Dolbier |
| 7,882,243 | B2 | 2/2011 | Ivory |
| 7,884,819 | B2 | 2/2011 | Kuesel |
| 7,886,045 | B2 | 2/2011 | Bates |
| 7,890,623 | B2 | 2/2011 | Bates |
| 7,893,936 | B2 | 2/2011 | Shearer |
| 7,904,829 | B2 | 3/2011 | Fox |

(56) References Cited

U.S. PATENT DOCUMENTS

| | | |
|---|---|---|
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | George |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | Mcvey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,243,064 B1 * | 8/2012 | Moravanszky ......... G06F 30/20 |
| | | 345/473 |
| 8,245,241 B2 | 8/2012 | Hamilton, II |
| 8,245,283 B2 | 8/2012 | Dawson |
| 8,265,253 B2 | 9/2012 | Bruce |
| 8,281,281 B1 | 10/2012 | Smyrl |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,390,623 B1 | 3/2013 | Guskov |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,147,288 B1 | 9/2015 | Johnston |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,384,593 B2 | 7/2016 | Anttila |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 9,898,838 B2 | 2/2018 | Shim |
| 9,905,036 B2 | 2/2018 | Kim |
| 10,609,334 B2 * | 3/2020 | Li ........................ G06V 40/161 |
| 10,664,942 B2 | 5/2020 | Paltashev |
| 10,792,566 B1 | 10/2020 | Schmid |
| 11,717,753 B2 | 8/2023 | Raymond |
| 11,724,188 B2 | 8/2023 | Raymond |
| 11,833,423 B2 | 12/2023 | Raymond |
| 12,134,038 B2 | 11/2024 | Raymond |
| 12,134,039 B2 | 11/2024 | Raymond |
| 12,179,113 B2 | 12/2024 | Salik |
| 2003/0177187 A1 | 9/2003 | Levine |
| 2004/0070595 A1 | 4/2004 | Atlas |
| 2005/0146524 A1 | 7/2005 | Gueziec |
| 2005/0179689 A1 | 8/2005 | Ohshima |
| 2005/0253843 A1 | 11/2005 | Losasso |
| 2006/0080072 A1 | 4/2006 | Lachman |
| 2007/0198363 A1 | 8/2007 | Quoc |
| 2007/0198364 A1 | 8/2007 | Quoc |
| 2008/0001963 A1 | 1/2008 | Lefebvre |
| 2008/0016176 A1 | 1/2008 | Leitner |

(56) References Cited

U.S. PATENT DOCUMENTS

| | | | |
|---|---|---|---|
| 2009/0062000 A1 | 3/2009 | Tanaka | |
| 2009/0113448 A1 | 4/2009 | Smith | |
| 2009/0253517 A1 | 10/2009 | Bererton | |
| 2009/0271821 A1 | 10/2009 | Zalewski | |
| 2011/0063415 A1 | 3/2011 | Gefen | |
| 2014/0198103 A1 | 7/2014 | Johansson | |
| 2014/0344725 A1 | 11/2014 | Bates | |
| 2015/0024852 A1 | 1/2015 | Pacey | |
| 2016/0191671 A1 | 6/2016 | Dawson | |
| 2017/0021274 A1 | 1/2017 | Vonderhaar | |
| 2017/0091992 A1 | 3/2017 | Rogers | |
| 2017/0200301 A1 | 7/2017 | Boissé | |
| 2018/0126276 A1 | 5/2018 | Shochet | |
| 2019/0192970 A1 | 6/2019 | Garbut | |
| 2019/0192972 A1 | 6/2019 | Garbut | |
| 2019/0286748 A1 | 9/2019 | Manoharan | |
| 2019/0355331 A1 | 11/2019 | Wood | |
| 2020/0001180 A1 | 1/2020 | Turner | |
| 2020/0020154 A1 * | 1/2020 | Kerckaert | G06T 15/06 |
| 2020/0045285 A1 | 2/2020 | Varerkar | |
| 2020/0269132 A1 | 8/2020 | Turner | |
| 2020/0368616 A1 | 11/2020 | Delamont | |
| 2021/0158597 A1 | 5/2021 | Hagland | |
| 2021/0194794 A1 | 6/2021 | Turner | |
| 2021/0225074 A1 * | 7/2021 | Meilland | G06T 17/20 |
| 2021/0329270 A1 | 10/2021 | Yea | |
| 2021/0407169 A1 * | 12/2021 | Swann | G06T 15/04 |
| 2022/0019573 A1 | 1/2022 | Gautron | |
| 2022/0028161 A1 | 1/2022 | Lawrence | |
| 2022/0053224 A1 | 2/2022 | Katsumata | |
| 2022/0067052 A1 | 3/2022 | Chauhan | |
| 2022/0096931 A1 | 3/2022 | Raymond | |
| 2022/0096932 A1 | 3/2022 | Raymond | |
| 2022/0096933 A1 | 3/2022 | Raymond | |
| 2022/0237872 A1 * | 7/2022 | Meilland | G06T 17/20 |
| 2023/0149813 A1 * | 5/2023 | Kohler | G06T 15/04 |
| | | | 463/31 |
| 2023/0372817 A1 | 11/2023 | Raymond | |
| 2023/0390639 A1 | 12/2023 | Raymond | |
| 2024/0165511 A1 | 5/2024 | Raymond | |

FOREIGN PATENT DOCUMENTS

| | | | |
|---|---|---|---|
| CA | 2143874 | | 6/2000 |
| CA | 2292678 | | 7/2005 |
| CA | 2701219 A1 * | | 10/2011 |
| CA | 2552135 | | 7/2013 |
| CN | 1334650 A | | 2/2002 |
| CN | 1202652 C | | 10/2002 |
| CN | 1141641 C | | 3/2004 |
| CN | 1494679 A | | 5/2004 |
| CN | 1219384 | | 9/2005 |
| CN | 1307544 | | 3/2007 |
| CN | 100407675 | | 7/2008 |
| CN | 100423016 C | | 10/2008 |
| CN | 100557637 | | 11/2009 |
| CN | 101001678 B | | 5/2010 |
| CN | 101436242 | | 12/2010 |
| CN | 101801482 B | | 12/2014 |
| EP | 668583 | | 8/1995 |
| EP | 0627728 B1 | | 9/2000 |
| EP | 0717337 B1 | | 8/2001 |
| EP | 0679977 B1 | | 10/2002 |

| | | | | |
|---|---|---|---|---|
| EP | 0679978 B1 | | 3/2003 | |
| EP | 0890924 B1 | | 9/2003 | |
| EP | 1377902 B1 | | 8/2004 | |
| EP | 0813132 B1 | | 1/2005 | |
| EP | 1380133 B1 | | 3/2005 | |
| EP | 1021021 B1 | | 9/2005 | |
| EP | 0930584 B1 | | 10/2005 | |
| EP | 0883087 B1 | | 8/2007 | |
| EP | 1176828 B1 | | 10/2007 | |
| EP | 2076888 B1 | | 7/2015 | |
| GB | 2339938 | | 10/2002 | |
| GB | 2352154 | | 7/2003 | |
| JP | 3033956 B2 | | 4/2000 | |
| JP | 3124916 B2 | | 1/2001 | |
| JP | 3177221 B2 | | 6/2001 | |
| JP | 3199231 B2 | | 8/2001 | |
| JP | 3210558 B2 | | 9/2001 | |
| JP | 3275935 | | 2/2002 | |
| JP | 3361745 | | 1/2003 | |
| JP | 3368188 B2 | | 1/2003 | |
| JP | 3470955 B | | 9/2003 | |
| JP | 3503774 | | 12/2003 | |
| JP | 3575598 | | 7/2004 | |
| JP | 3579823 B | | 7/2004 | |
| JP | 3579154 B2 | | 10/2004 | |
| JP | 3701773 B2 | | 10/2005 | |
| JP | 3777161 | | 3/2006 | |
| JP | 3914430 B | | 2/2007 | |
| JP | 3942090 B | | 4/2007 | |
| JP | 3962361 | | 5/2007 | |
| JP | 4009235 B | | 9/2007 | |
| JP | 4225376 | | 12/2008 | |
| JP | 4653075 | | 12/2010 | |
| JP | 5063698 B | | 8/2012 | |
| JP | 5159375 B2 | | 3/2013 | |
| JP | 5352200 B2 | | 11/2013 | |
| JP | 5734566 B2 | | 6/2015 | |
| KR | 102393594 B1 * | 11/2019 | | G06F 8/20 |
| KR | 20210037495 A * | 4/2021 | | G06F 8/20 |
| MY | 117864 A | | 8/2004 | |
| SG | 55396 | | 12/1998 | |
| WO | 2002073457 | | 9/2002 | |
| WO | 20020087156 | | 10/2002 | |
| WO | 2004086212 | | 10/2004 | |
| WO | 2005079538 | | 9/2005 | |
| WO | 2007101785 | | 9/2007 | |
| WO | 2008037599 | | 4/2008 | |
| WO | 2008074627 | | 6/2008 | |
| WO | 2008095767 | | 8/2008 | |
| WO | 2009037257 | | 3/2009 | |
| WO | 2009104564 | | 8/2009 | |
| WO | 2010096738 A1 | | 8/2010 | |

OTHER PUBLICATIONS

Heok et al. "A Review on Level of Detail" Proceedings of the International Conference on Computer Graphics, Imaging and Visualization (CGIV'04) 2004 (Year: 2004).

Forsman, "Automatic LOD selection" Department of Science and Technology Linköping University Oct. 20, 2017 (Year: 2017).

Unity User Manual 2019.4 accessed from hhttps://web.archive.org/web/20200917105747/https://docs.unity3d.com/Manual/ class-LODGroup.html andhttps://web.archive.org/web/20200921105526/https://docs.unity3d.com/Manual/LevelOfDetail.html(Year: 2019).

* cited by examiner

202  Generate camera locations

204  Create point cloud

206  Generate mesh based on point cloud

208  Simplify mesh to create series of proxy meshes

210  Load proxy meshes at runtime based on required LOD

400

500A

500C

600

COMPUTER-IMPLEMENTED METHODS FOR GENERATING LEVEL OF DETAIL ASSETS FOR DYNAMIC RENDERING DURING A VIDEOGAME SESSION

CROSS-REFERENCE

The present application relies on U.S. Patent Provisional Application No. 63/263,974, titled "Computer-Implemented Methods for Generation of Level of Detail Assets for Rendering During Gameplay" and filed on Nov. 12, 2021, for priority, which is herein incorporated by reference in its entirety.

FIELD

The present specification is related generally to the field of video games and graphics processing. More specifically the present specification is related to the automated generation of level of detail (LOD) assets, manual optimization of the automatically generated LOD assets, as well as the dynamic selection and rendering of the optimized LOD assets during runtime.

BACKGROUND

Objects in a video game scene are typically modeled as three-dimensional meshes comprising geometric primitives such as, for example, triangles or other polygons wherein the coordinate points are connected by edges. For rendering and displaying such three-dimensional meshes or object models, large numbers of computations need to be performed in order to determine the locations of, and complex interactions with, those coordinate points and edges.

While the desired levels of geometric detail in games are increasing, gaming hardware (both personal computer-based as well as console-based) are not necessarily advancing as fast in order to manage the computationally intensive workload of rendering and displaying highly complex polygonal meshes. Furthermore, even if some players do have advanced hardware, other players may have older or outdated hardware, yet the same video game must deliver equivalent gaming experiences to both groups. One way to address this technical challenge is to increase geometric detail when virtual objects are closer to a virtual camera position in a game and decrease geometric detail when virtual objects are further away from the virtual camera's position. In a video game, when a player traverses a virtual landscape, portions of the landscape appear in greater detail (i.e. the detail increases) the closer the player gets to that portion of the landscape. Conversely, portions of the landscape that are sufficiently in the distance are shown in a very low level of detail. The concept of dynamically changing the amount of detail being shown is called Level of Detail or LOD.

There are many challenges in implementing an LOD approach, however. At the highest level, the challenges include a) creating the right Level of Detail assets which should be used at various "distances" or "switch distances" and b) selecting the right LOD objects in the right context during the actual game (runtime). If not done correctly, a player might experience "pixel pop", where the switch from one LOD object to another becomes obvious. It is also desirable to determine which level of detail to use when rendering a mesh, so that the mesh is detailed enough to provide a desired level of visual or perceptual fidelity without being so detailed as to overburden rendering resources.

Conventional LOD object generation is highly manual. However, when starting out with extremely high resolution (high-polygon) assets, it is not feasible to do everything manually. At the same time, a purely automated approach does not result in optimized LOD assets every time, and therefore computer graphic artists do need to provide manual input. There are many variables which have to be chosen in order to effectively generate an optimal LOD and, conventionally, those variables have to be considered, and accounted for, manually.

A conventional grid clip-map LOD requires a multitude of triangles to maintain the shape of a terrain. Accordingly, there is a need for automated LOD generation methods and systems that use a fewer number of triangle or any other types of polygons.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification is directed toward a method of generating level of detail (LOD) visual assets of a virtual landscape for rendering in a video game, the method comprising: creating a point cloud around a portion of the virtual landscape; generating a mesh based on the point cloud; and simplifying the mesh to create a series of proxy meshes, wherein the proxy meshes are dynamically rendered during an execution of the video game and as the LOD visual asset changes for the portion of the virtual landscape.

Optionally, the creating the point cloud comprises placing one or more virtual imaging probes at least one location in the portion of the virtual landscape.

Optionally, a first set of virtual imaging probes are placed in one of a spherical and a hemispherical configuration around the at least one location.

Optionally, each of the one or more virtual imaging probes is configured to gather image data from the at least one location in the portion of the virtual landscape and wherein the gathered image data is saved to a data structure.

Optionally, said data structure is stored in a cloud.

Optionally, generating the mesh comprises applying Poisson reconstruction to the point cloud.

In some embodiments, the present specification is directed toward a computer readable non-transitory medium comprising a plurality of executable programmatic instructions wherein, when said plurality of executable programmatic instructions are executed by a processor in a computing device, a process for generating level of detail (LOD) of visual assets of a virtual landscape, for rendering in a video game, the plurality of executable programmatic instructions comprising: creating, by an LOD management module, a point cloud around a portion of the virtual landscape; generating, by the LOD management module, a mesh based on the point cloud; and simplifying, by the LOD management module, the mesh to create a series of proxy meshes, wherein the proxy meshes are dynamically rendered during execution of the video game and as the LOD visual asset changes for the portion of the virtual landscape.

Optionally, the creating of the point cloud, by the LOD management module, comprises placing, by the LOD management module, one or more virtual imaging probes at least one location in the portion of the virtual landscape.

Optionally, a first set of virtual imaging probes are placed, by the LOD management module, in one of a spherical and a hemispherical configuration around the at least one location.

Optionally, each of the one or more virtual imaging probes is configured to gather image data from the at least one location in the portion of the virtual landscape and save the gathered image data to a data structure.

Optionally, the data structure is a cloud.

Optionally, the generating of the mesh, by the LOD management module, comprises applying Poisson reconstruction to the point cloud.

In some embodiments, the present specification is directed towards a method of generating level of detail (LOD) visual assets of a virtual landscape, for rendering in a video game, comprising creating a point cloud around a portion of the virtual landscape by placing one or more virtual imaging probes at least one location in the portion of the virtual landscape, wherein the method for placing one or more virtual imaging probes comprises: assigning a value to each quad in a mesh; creating a cube map by rendering six images, on a graphical processing unit (GPU), for the center point of all nodes in an octree that is not a leaf node; checking, on the GPU, for values of zero for each pixel in the six images; creating a node bit array list, on the central processing unit, of all bit arrays read back from the GPU; creating a work bit array, wherein all of the bits in the work bit array are set to zero; counting a number for set bits from the node bit array list where a corresponding bit in the work bit array is not set; selecting a node with the largest counted value and for each of the bits that are set in the node bit array, setting the bits in the work bit array; adding a center position of the selected node to a list of final node positions; removing any nodes that do not have any corresponding bits set in the work bit array from the node list; and generating a result in the form of a final nodes position list once all the nodes in the node list have been covered.

Optionally, the method further comprises determining if there are nodes remaining in the node list.

Optionally, the method further comprises determining if the maximum allowed nodes in the final node list has been reached. Optionally, the maximum allowed nodes is 300. Still optionally, if the maximum allowed nodes in the final node list has not been reached, repeating the method of claim 1.

Optionally, each value is a unique count beginning at 1.

Optionally, the rendered six images are one in each direction of a three-dimensional (3D) axis (Positive X, Negative X, Positive Y, Negative Y, Positive Z, Negative Z).

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skill in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
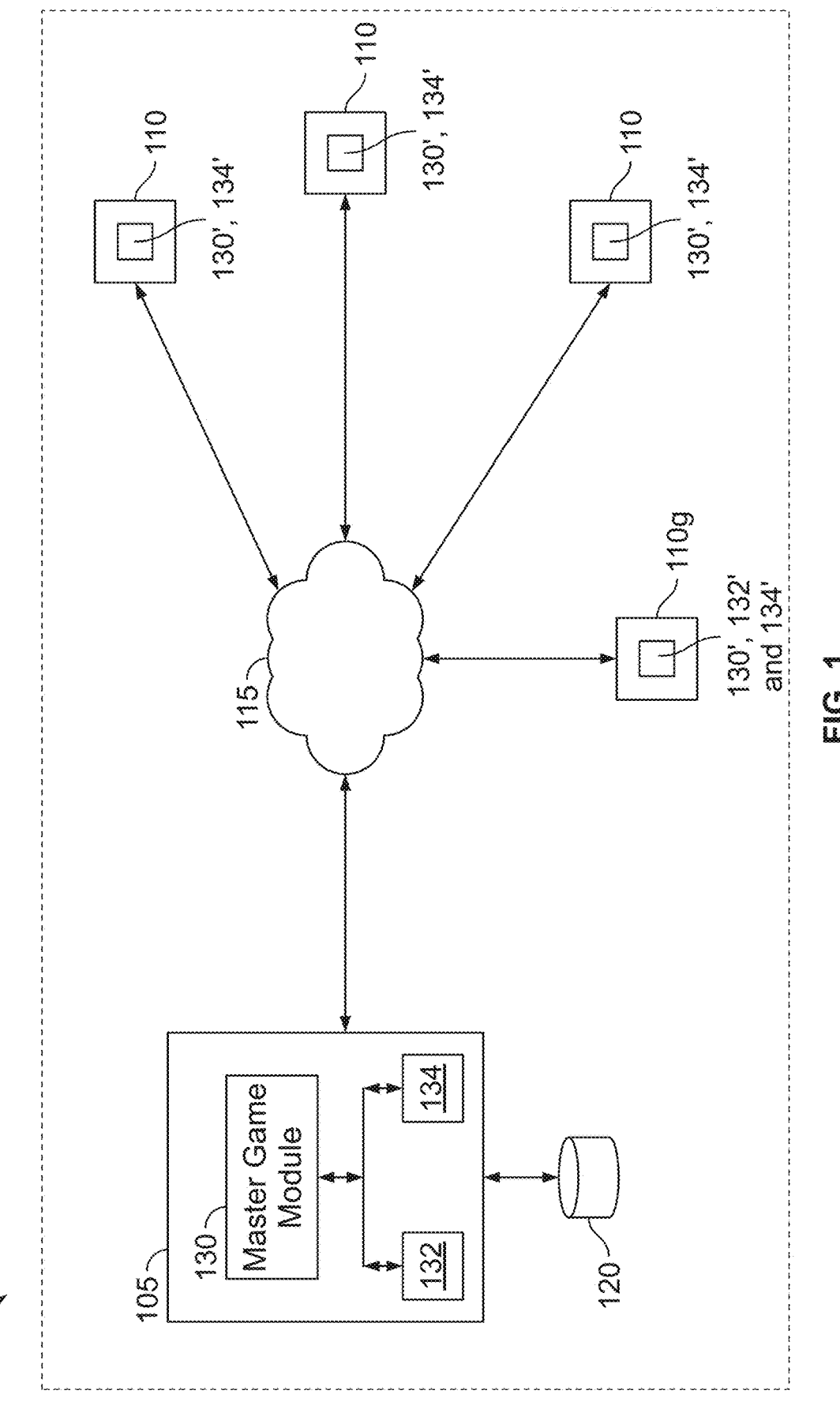
FIG. 1 illustrates an embodiment of a multi-player online gaming or massively multiplayer online gaming system/environment in which the systems and methods of the present specification may be implemented or executed.

In some embodiments, the system and methods of the present specification enables the creation of a "point cloud" around a portion of a virtual landscape of a video game. In embodiments, the virtual landscape is selected by an artist. In embodiments, a mesh is generated based on the point cloud whereby the mesh is subsequently parsed into portions, broken-down or otherwise simplified to create a series of proxy meshes that are dynamically loaded during runtime as the LOD requirement changes. Thus, embodiments of the present specification enable a far more efficient LOD generation. While a conventional approach may use a special program code for a given LOD, the present specification applies a generic approach to any set of pixels for each LOD. In embodiments, any arbitrary number of meshes that represent a higher resolution or higher degree of detail, are replaced with a new mesh (proxy mesh) that removes material borders or other detail. In embodiments, a proxy mesh is a mesh that replaces a group of meshes in a particular game. Techniques of the present specification can be used to create combined meshes for groups of objects in levels of detail that are far away from a player within a virtual landscape of a video game, such that many details are not required or, more generally, in any situation where meshes need to be merged and/or multiple materials need to be removed.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

The term "a multi-player online gaming environment" or "massively multiplayer online game" may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multi-player gaming environment or massively multi-player online game is a computer-related technology, a non-generic technological environment, and should not be abstractly considered a generic method of organizing human activity divorced from its specific technology environment.

In various embodiments, the system includes at least one processor capable of processing programmatic instructions, has a memory capable of storing programmatic instructions, and employs software comprised of a plurality of programmatic instructions for performing the processes described herein. In embodiments, a computer-readable non-transitory medium comprises the plurality of executable programmatic instructions. In one embodiment, the at least one processor is a computing device capable of receiving, executing, and transmitting a plurality of programmatic instructions stored on a volatile or non-volatile computer readable medium.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enables or cause the CPU of the computing device to perform various functions and processes. In alternate embodiments, hardwired circuitry may be used in place of, or in combination with, software instructions for implementation of the processes of systems and methods described in this application. Thus, the systems and methods described are not limited to any specific combination of hardware and software.

The term "module", "application" or "engine" used in this disclosure may refer to computer logic utilized to provide a desired functionality, service or operation by programming or controlling a general-purpose processor. Stated differently, in some embodiments, a module, application or engine implements a plurality of instructions or programmatic code to cause a general-purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

The term "platform" or "target gaming platform" used in this disclosure may refer to hardware and/or software specifications of a player's client device (which may be a PC or a gaming console, for example). In some embodiments, "platform" may refer to at least GPU (Graphics Processing Unit) specification, CPU specification, display screen resolution, RAM and hard disk space available and a type of operating system.

The term "offline" or "offline process" used in this disclosure refers to one or more programmatic instructions or code that may be implemented or executed while the game is not being played by any player (that is, while the one or more game servers are not rendering a game for playing).

The term "runtime" or "runtime process" used in this disclosure refers to one or more programmatic instructions or code that may be implemented or executed during gameplay (that is, while the one or more game servers are rendering a game for playing).

The term "switch distance" used in this disclosure refers to a distance of an object from an in-game virtual camera at which the game switches from one LOD to another.

The term "point cloud" refers to a group of data points where each data point is associated with, or defined by, a data structure that contains various data, including, at least, a coordinate location corresponding to a point or specific location within the virtual landscape of a video game. Point clouds, in embodiments, may have up to 100 million (M) data points which could be used to represent any virtual space in tremendous detail, including surfaces, characters, weapons, objects, textures, among other visual details.

A "data point" is defined by a data structure for a single location within the point cloud. Additionally, the data contained in the data structure preferably geometrically defines a tangential face to a pixel that would be rendered at that location. The data is aggregated, collected or otherwise determined by one or more imaging probes, configured to capture image data at that location, focused at the associated "point" within the virtual landscape of the video game. Each data point in the point cloud can be defined by a data structure that stores any set of visual characteristics and represents a wide array of values.

The term "proxy mesh" refers to a mesh that replaces one or more other meshes in a video game. The video game may include multiple proxy meshes that form a chain for LOD assets of that video game. Each level in the LOD is further defined by a proxy mesh that is generated at least in part by a point cloud operation.

OVERVIEW

FIG. 1 illustrates an embodiment of a multi-player online gaming or massively multiplayer online gaming system/environment 100 in which the systems and methods of the present specification may be implemented or executed. The system 100 comprises client-server architecture, where one or more game servers 105 are in communication with one or more client devices 110 over a network 115. Players and non-players, such as computer graphics artists or designers, may access the system 100 via the one or more client devices 110. The client devices 110 comprise computing devices such as, but not limited to, personal or desktop computers, laptops, Netbooks, handheld devices such as smartphones, tablets, and PDAs, gaming consoles and/or any other computing platform known to persons of ordinary skill in the art. Although three client devices 110 are illustrated in FIG. 1, any number of client devices 110 can be in communication with the one or more game servers 105 over the network 115.

The one or more game servers 105 can be any computing device having one or more processors and one or more computer-readable storage media such as RAM, hard disk or any other optical or magnetic media. The one or more game servers 105 include a plurality of modules operating to provide or implement a plurality of functional, operational or service-oriented methods of the present specification. In some embodiments, the one or more game servers 105 include or are in communication with at least one database system 120. The database system 120 stores a plurality of game data including data representative of a plurality of LOD (Level of Detail) assets (along with switch distances corresponding to the plurality of LOD assets and LOD-related attributes, characteristics or parameters) associated with at least one game that is served or provided to the client devices 110 over the network 115. In some embodiments, the one or more game servers 105 may be implemented by a cloud of computing platforms operating together as game servers 105.

In accordance with aspects of the present specification, the one or more game servers 105 provide or implement a plurality of modules or engines such as, but not limited to, a master game module 130, a hybrid LOD management module 132, and a rendering module 134. In some embodiments, the one or more client devices 110 are configured to implement or execute one or more of a plurality of client-side modules some of which are same as or similar to the modules of the one or more game servers 105. For example, in some embodiments each of the player client devices 110 executes a client-side game module 130' (also referred to as—client game module 130') that integrates a client-side rendering module 134' (also referred to as—client rendering module 134') while at least one non-player client device 110g executes the client game module 130' that integrates a client-side hybrid LOD management module 132' (also referred to as—client LOD management module 132') and the client rendering module 134'.

In some embodiments, the at least one non-player client device 110g does not include the client LOD management module 132'. Instead, the non-player client device 110g is used by the computer graphics artist or designer to log into the one or more game servers 105 and execute the hybrid LOD management module 132 on the server to auto-generate a plurality of LODs and their associated switch distances, offline. In alternate embodiments, which are applicable to non-networked gaming devices, a user employs client device 110g to access game details from a local data file. The auto-generated plurality of LODs and their associated switch distances are stored in the at least one database 120.

In some embodiments, the one or more game servers 105 do not implement the hybrid LOD management module 132. Instead, the hybrid LOD management module 132 is implemented on the non-player client device 110g wherein the computer graphics artist or designer generate LODs, offline, in accordance with the present specification. The LODs, meshes, and material generated by the designers and content creators may be stored in the at least one non-player client device's 110g drive. In some embodiments, the auto-generated plurality of LODs and their associated switch distances are then uploaded, via the network 115, and stored in the at least one database 120.

While FIG. 1 represents an exemplary overview of a general framework of a network wherein the embodiments of the specification may be applicable, persons skilled in the art can appreciate that the embodiments of the functionalities and programs of the present specification can also be implemented by modules or engines in non-networked gaming devices, including mobile phones, consoles, and personal computers.

While various aspects of the present specification are being described with reference to functionalities or programming distributed across multiple modules or engines 132 and 134, it should be appreciated that, in some embodiments, some or all of the functionalities or programming associated with these modules or engines may be integrated within fewer modules or in a single module—such as, for example, in the master game module 130 itself on the server side and in the client gaming module 130' on the client side.

In embodiments, the master game module 130 is configured to execute an instance of an online game to facilitate interaction of the players with the game. In embodiments, the instance of the game executed may be synchronous, asynchronous, and/or semi-synchronous. The master game module 130 controls aspects of the game for all players and receives and processes each player's input in the game. In other words, the master game module 130 hosts the online game for all players, receives game data from the client devices 110 and transmits updates to all client devices 110 based on the received game data so that the game, on each of the client devices 110, represents the most updated or current status with reference to interactions of all players with the game. Thus, the master game module 130 transmits game data over the network 115 to the client devices 110 for use and rendering by the game module 130' to provide local versions and current status of the game to the players.

On the client-side, each of the one or more player client devices 110 implements the game module 130' that operates as a gaming application to provide a player with an interface between the player and the game. The game module 130' generates the interface to render a virtual environment, virtual space or virtual world associated with the game and enables the player to interact in the virtual environment to perform a plurality of game and other tasks and objectives. The game module 130' accesses game data received from the game server 105 to provide an accurate representation of the game to the player. The game module 130' captures and processes player inputs and interactions within the virtual world or environment and provides updates to the game server 110 over the network 115.

In embodiments, the game module 130' (for each of the one or more player client devices 110) also integrates the client rendering module 134' that, in data communication with the server-side rendering module 134, performs a plurality of tasks (during runtime or execution of gameplay) such as: a) determining which representation, version or LOD, out of a set, group or chain of LOD assets, to render for a given gameplay view or scene, b) assessing a player's client device configurations and platform specifications such as, but not limited to, display screen resolution, GPU capabilities and memory availability, c) monitoring network (for example, Internet) connectivity or streaming bandwidth fluctuations, GPU workload and performance parameters (such as, for example, frame latency), memory usage and the player's field of view (FOV) changes, d) dynamically applying one or more of a plurality of corrective factors to offline authored switch distances of various LOD assets, wherein the one or more of a plurality of corrective factors include factors such as FOV scaling, screen resolution scaling, vertex processing efficiency scaling, graphical processing unit (GPU) performance scaling and memory budget-based biasing, and e) implementing a plurality of case, context or scenario based interventions such as rejecting objects smaller than a predefined threshold, switching off procedural vertex motion or animation for more distant LODs, delaying or not allowing LODs corresponding to a 'static' object to switch to lower complexity LODs earlier than designated by the offline authored switch distances of the respective LODs, implementing LOD fallback plans, and rendering proxy LODs, when needed.

In embodiments, the at least one client device 110g is configured as a non-player computing device to enable a graphics artist or designer to interact with the one or more game servers 105. In embodiments, the at least one client device 110g also implements the client game module 130' that, in some embodiments, further integrates the client LOD management module 132' and the client rendering module 134'. In accordance with some aspects of the present specification, an offline execution of the client LOD management module 132', in data communication with the server-side LOD management module 132, enables auto-generation of one or more chains of LOD assets with associated offline authored switch distances. The offline execution of the client LOD management module 132', in data communication with the server-side LOD management module 132, further results in generating one or more GUIs (graphical user interfaces) to enable the graphics designer or artist to optimize and modify one or more of the auto-generated chains of LOD assets and associated offline switch distances on the basis of at least one of a plurality of LOD-related attributes, characteristics or parameters.

The database system 120 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database system 120 may comprise one or more such databases that reside in one or more physical devices and in one or more physical locations.

During an offline process, hybrid LOD management module or engine 132 implements a plurality of instructions or programmatic code to enable automated generation of a plurality of representations or versions of an object model (that corresponds to a most detailed, complex or highest resolution object model). In embodiments, each of the plurality of representations or versions of the object model has a different level of detail (LOD) ranging from a most detailed or complex LOD representation to a least complex (or simplest) LOD representation. LOD management module 302 operates with data collected for multiple points within the virtual space or landscape of a video game to generate meshes and further simplify those meshes to modify one or more of the plurality of representations or versions of the object model on the basis of at least one of a plurality of LOD-related attributes, characteristics or parameters.

In embodiments, a representation, version or LOD of an object model is described using a plurality of geometric primitives such as, for example, triangles, quadrilaterals, polygons or non-uniform rational basis spline (NURBS).

During runtime, when the video game is actively played by one or more players, rendering module 134 implements a plurality of instructions or programmatic code to render the plurality of representations or versions of an object model based on required LODs.

Figure 2:
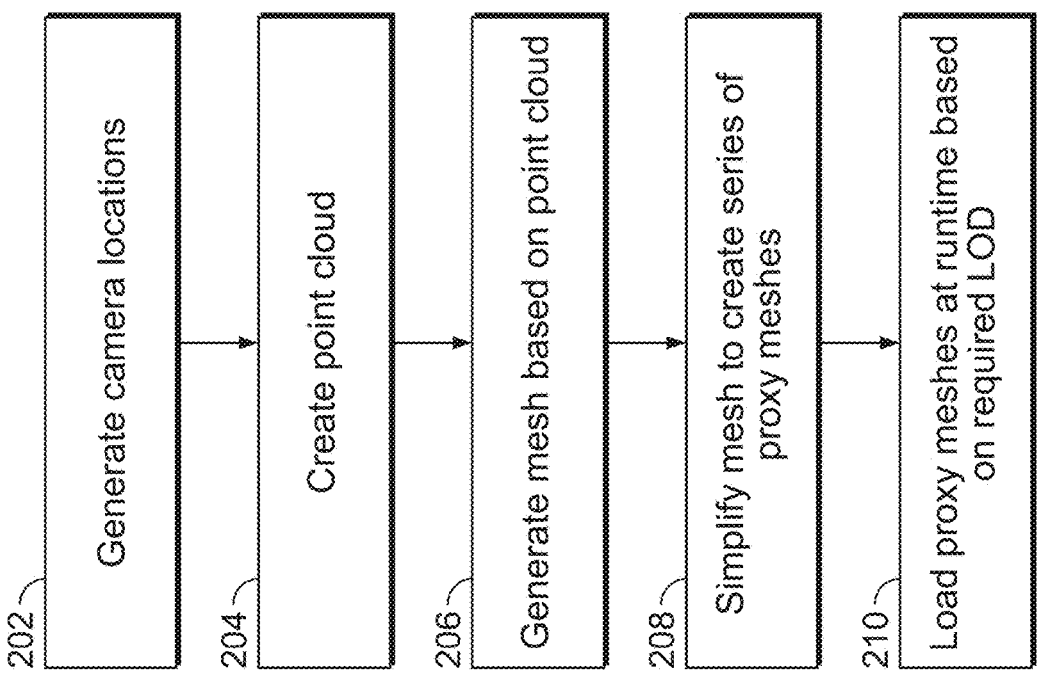
FIG. 2 is a flow chart illustrating exemplary process steps for implementing some embodiments in accordance with the present specification.
Figure 3A:
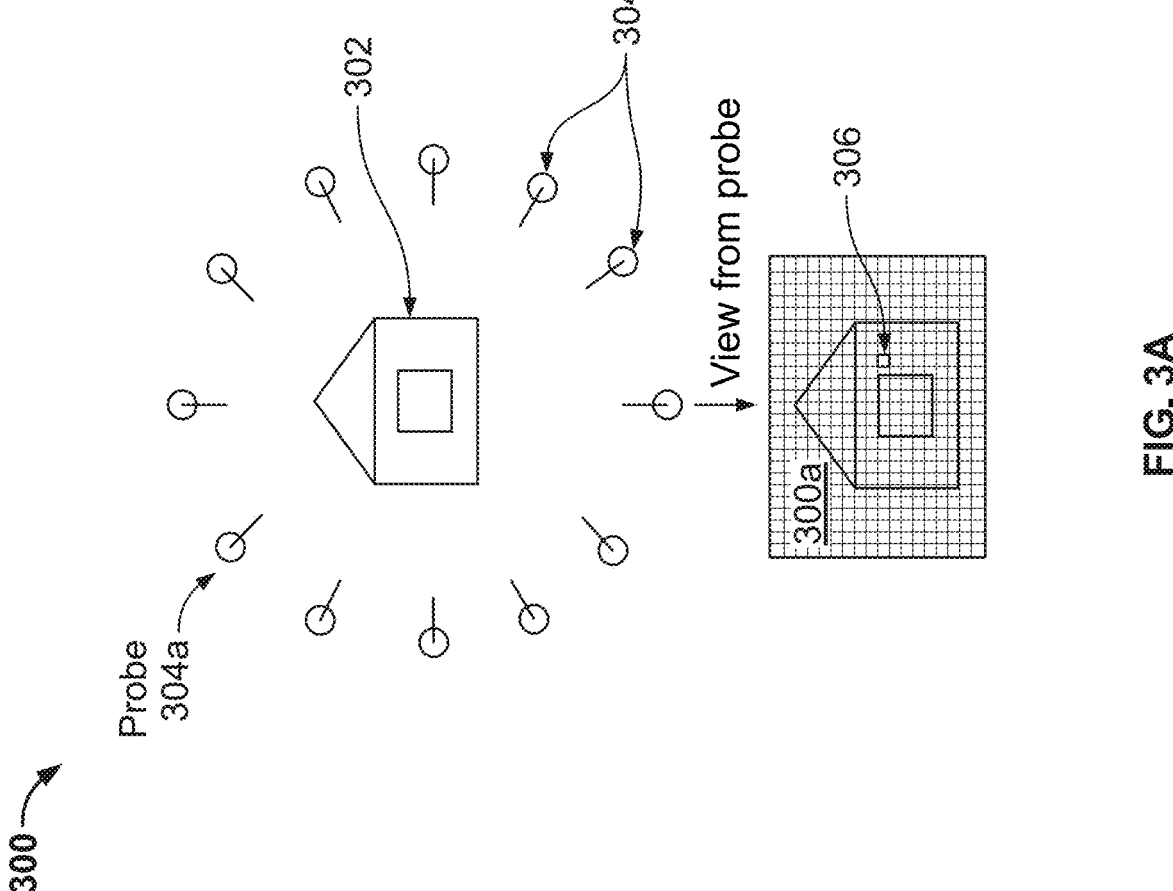
FIG. 3A is an image illustrating a house surrounded by multiple imaging probes, in accordance with an exemplary embodiment of the present specification.

FIG. 2 is a flow chart illustrating an exemplary process of implementing some embodiments in accordance with the present specification. The process steps of FIG. 2 will be described in conjunction with certain system components described with respect to FIG. 1. Therefore, the figures will be referred to simultaneously. At step 202, locations for one or more imaging probes (also termed herein as 'cameras') are generated around an object or a location. A scene or a location within a virtual landscape of a video game is captured by the one or more imaging probes. For example, FIG. 3A is an image 300 illustrating a house 302 surrounded by multiple or a plurality of imaging probes 304, in accordance with an exemplary embodiment of the present specification. House 302 may be located within a virtual landscape of a video game. In some embodiments, a specific point 306 at the location, such as of house 302, is captured by the imaging probes 304, which are positioned at multiple angles. Image 300a is a view of the house 302 captured by a single probe 304a. Point 306 is a single point in a point cloud and is shown within image 300a generated by probe 304a. The point cloud is formed from multiple points, such as point 306, within image 300. In some embodiments, 120 or 360 imaging probes 304 are arranged in a hemispherical or a spherical pattern, respectively, at various angles around the point 306. The number of imaging probes may be varied based on settings created by a content creator. In some embodiments, there is no upper limit to the number of imaging probes that are used.

Figure 3B:
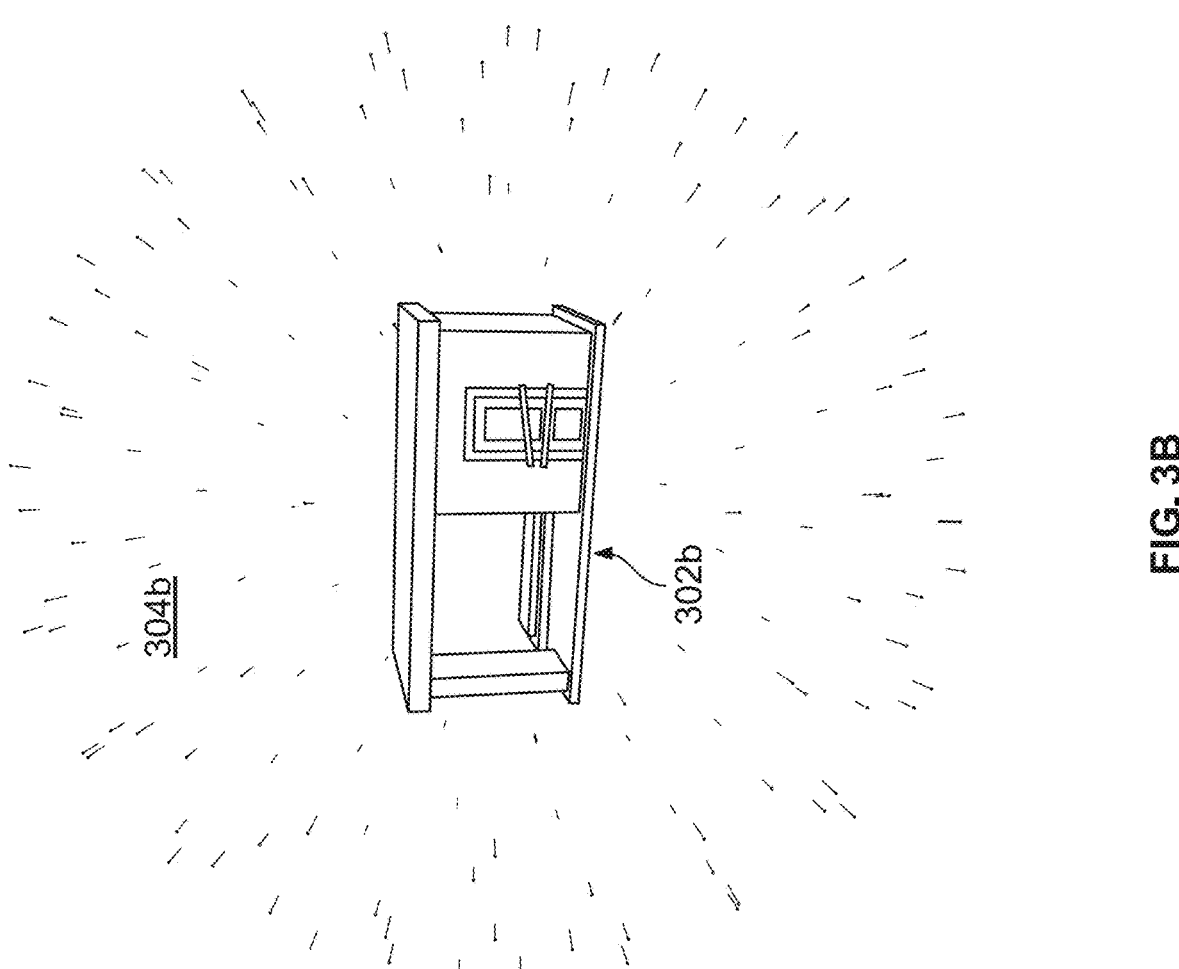
FIG. 3B is an exemplary image illustrating a house that is surrounded by a spherical arrangement of probes, in accordance with some embodiments of the present specification.

FIG. 3B is an exemplary image illustrating a house 302b that is surrounded by a spherical arrangement of probes 304b, in accordance with some embodiments of the present specification. In embodiments, the pattern or arrangement of the plurality of probes is selected by a content creator. In some embodiments, it is preferred to use a hemispherical arrangement of probes when there is no bottom of a certain view. In an example, if the interior portions of an object are visible when viewed from below, then there is no bottom blocking that view, and the object may be captured using a hemispherical arrangement of imaging probes. Referring back to FIG. 3A, the number of imaging probes 304 positioned around the point 306 is based on the location of the point 306 and whether the point is situated against a surface (such as a wall) or has a bottom (such as a floor). Additional imaging probes may be placed around the point to capture even more details of the location. Thus, the imaging probes are arranged in order to capture the point from sufficient angles, when the final image reproduced by the embodiments of the present specification is clear so that holes in the geometry, among other distortions, are avoided.

Figure 4A:
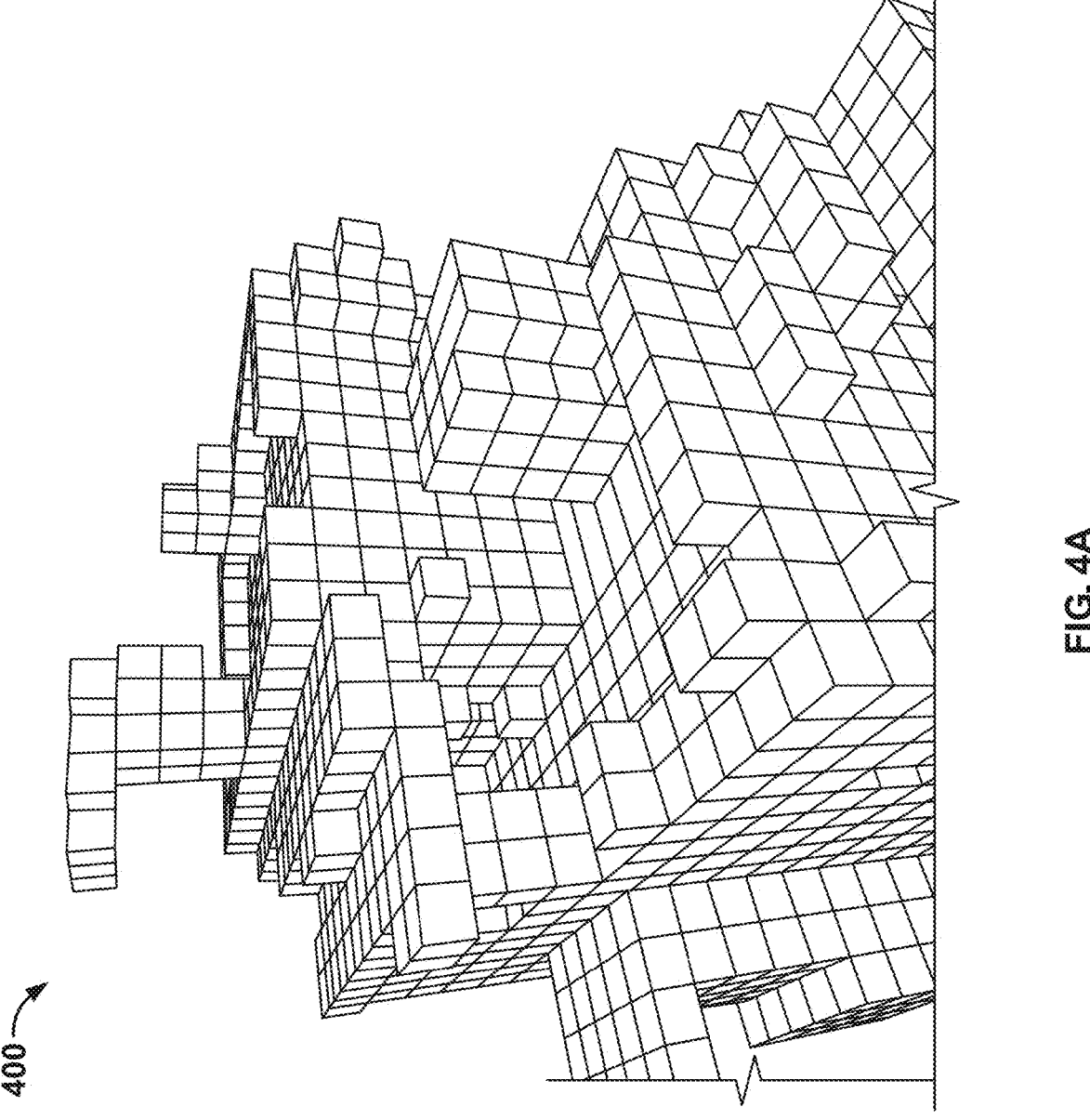
FIG. 4A is an image illustrating a scene from a virtual space that is turned into an octree, whereby the octree is converted into a mesh with a cube for each leaf node, to determine optimal positions of imaging probes, in accordance with one embodiment of the present specification.

In some embodiments, an automated method is used to identify optimal locations for positioning the imaging probes in a graphic scene. In one embodiment, an octree is created of all of the triangles (or polygons) in the scene. By way of reference, an octree is a tree data structure in which each internal node has exactly eight children. Each node in an octree subdivides or partitions the three-dimensional space it represents into eight octants. In a point region octree, the node stores an explicit three-dimensional point, which is the "center" of the subdivision for that node; the point defines one of the corners for each of the eight children. In a matrix-based octree, the subdivision point is implicitly the center of the space the node represents. In the context of the present specification, leaf nodes (that is, nodes that do not have any child nodes) in the octree are created where any triangle intersects the octree. The depth of the tree can vary depending on scene size. The octree is then turned into a mesh with a cube map for each leaf node, wherein the cube map is created by rendering six images, one in each direction of a three-dimensional axis. FIG. 4A illustrates an exemplary image of an octree 400 turned into a mesh for each leaf node. A center point of a non-leaf-node in the octree—preferably, a point that can see the greatest number of quads in the mesh—is chosen. Thereafter, nodes that can see the greatest number of quads that have not been seen yet are continuously chosen.

Figure 4B:
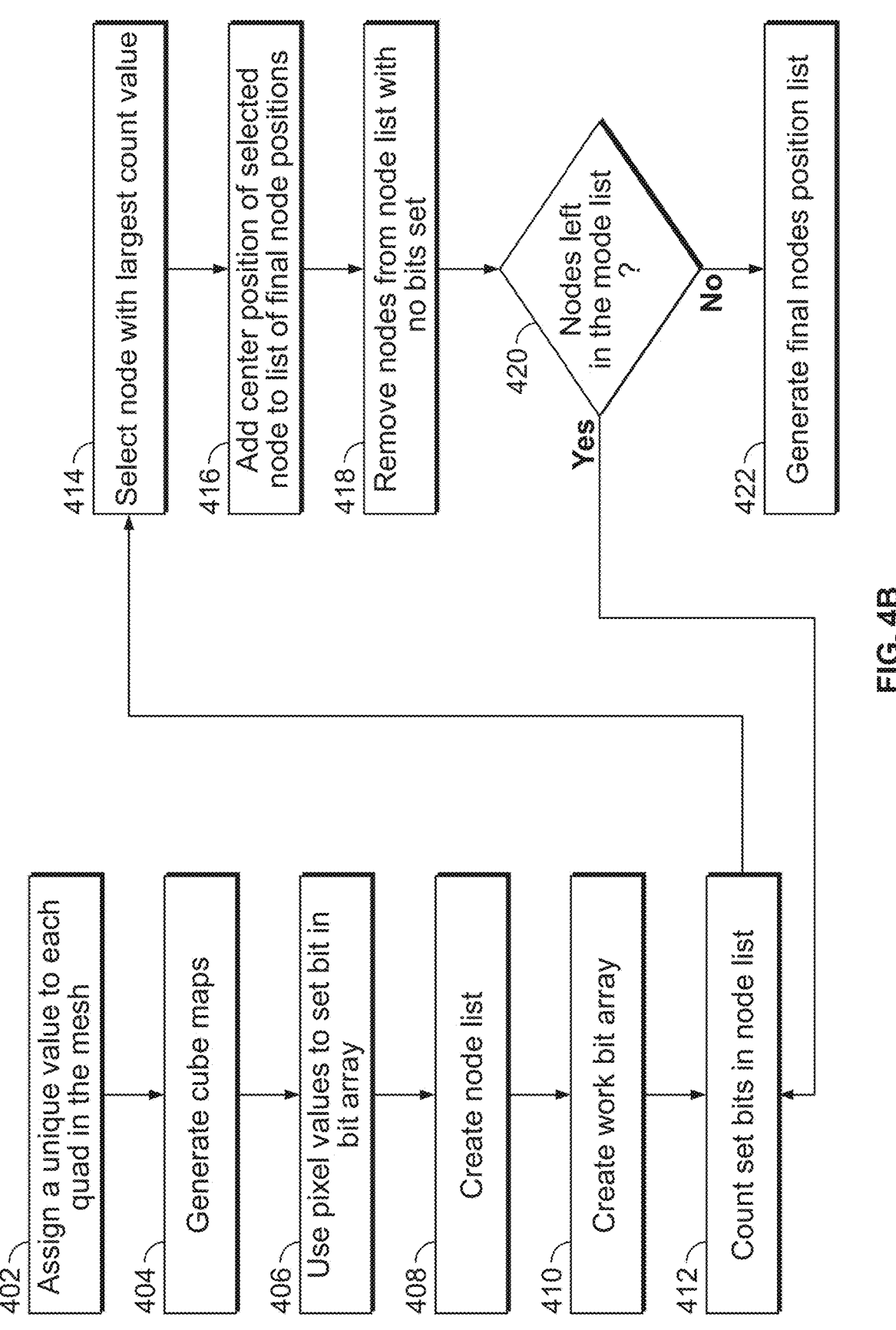
FIG. 4B is a flow chart describing an exemplary set of steps that can be used to generate a list of optimal positions for imaging probes, in embodiments of the present specification.

FIG. 4B is a flow chart that describes an exemplary set of steps that can be used to generate a list of optimal positions for imaging probes so that they may capture the points in a graphic scene. At step 402, a unique value is assigned to each quad in the mesh. In one embodiment, the value is a unique count from 1 and upwards. At step 404, on the Graphic Processing Unit (GPU) for the center point of all nodes in the octree that is not a leaf node, six images are rendered, one in each direction of a three-dimensional (3D) axis (Positive X, Negative X, Positive Y, Negative Y, Positive Z, Negative Z), creating a cube map. The output of this step is the unique value for the quads. Any pixels with no quads covering it will have a value of zero. At step 406, on the GPU, a check is performed for values of zero for each pixel in the six images. If zero, nothing is done, otherwise the pixel value will be the unique identifier and it is used to set a bit in a bit array associated with that node. At step 408, on the CPU, all the bit arrays are read back from the GPU and a list is created for them, wherein the list is referred herein as the "node list" or "node bit array". At step 410, a bit array is created with all the bits set to zero, the resultant array referred herein as the "work bit array". At step 412, for each node list item, the number of set bits where the corresponding bit in the work bit array is not set, are counted. At step 414, a node is selected with the largest counted value (chosen node) and each of the bits that are set in the node bit array are then set in the work bit array. At step 416, a center position of the chosen node is added to a list of final node positions. At step 418, any nodes that do not have any corresponding bits set in the work bit array are removed from the node list. At step 420, if there are nodes left in the node list and the maximum allowed nodes in the final nodes list has not been reached, then the process repeats itself from step 412. In one embodiment, the maximum allowed nodes is 300. In embodiments, the maximum allowed nodes may range from 1 to 100,000 or any increment therein or any upper bound that will achieve the objectives of the present specification. At step 422, once all the nodes in the node list have been covered, a result is generated in the form of the final nodes position list.

Data from each angle is stored in a data structure and is subsequently used to render the point, such as point 306 shown in FIG. 3. At step 204, a point cloud is created by the LOD management module 132. Each data structure, reflective of data characterizing a single point, is gathered in a storage cloud, termed as the point cloud. The data structure corresponding to each point includes at least a coordinate describing that point in world coordinates within the virtual landscape and data describing a tangential face to a pixel that would be rendered at that point. The data structure also preferably includes data representative of visual properties of the associated point. The visual properties may include the point's albedo, specularity, degree of occlusion, and roughness, among other characteristics. Below is an example of a data structure, in accordance with one embodiment of the present specification:

```
struct PointData_t
{
    float3 pos;
    float3 faceNormal;
    float3 pixelNormal;
    float3 albedo;
    float3 specularity;
    float gloss;
    float occlusion;
}
```

Figure 5A:
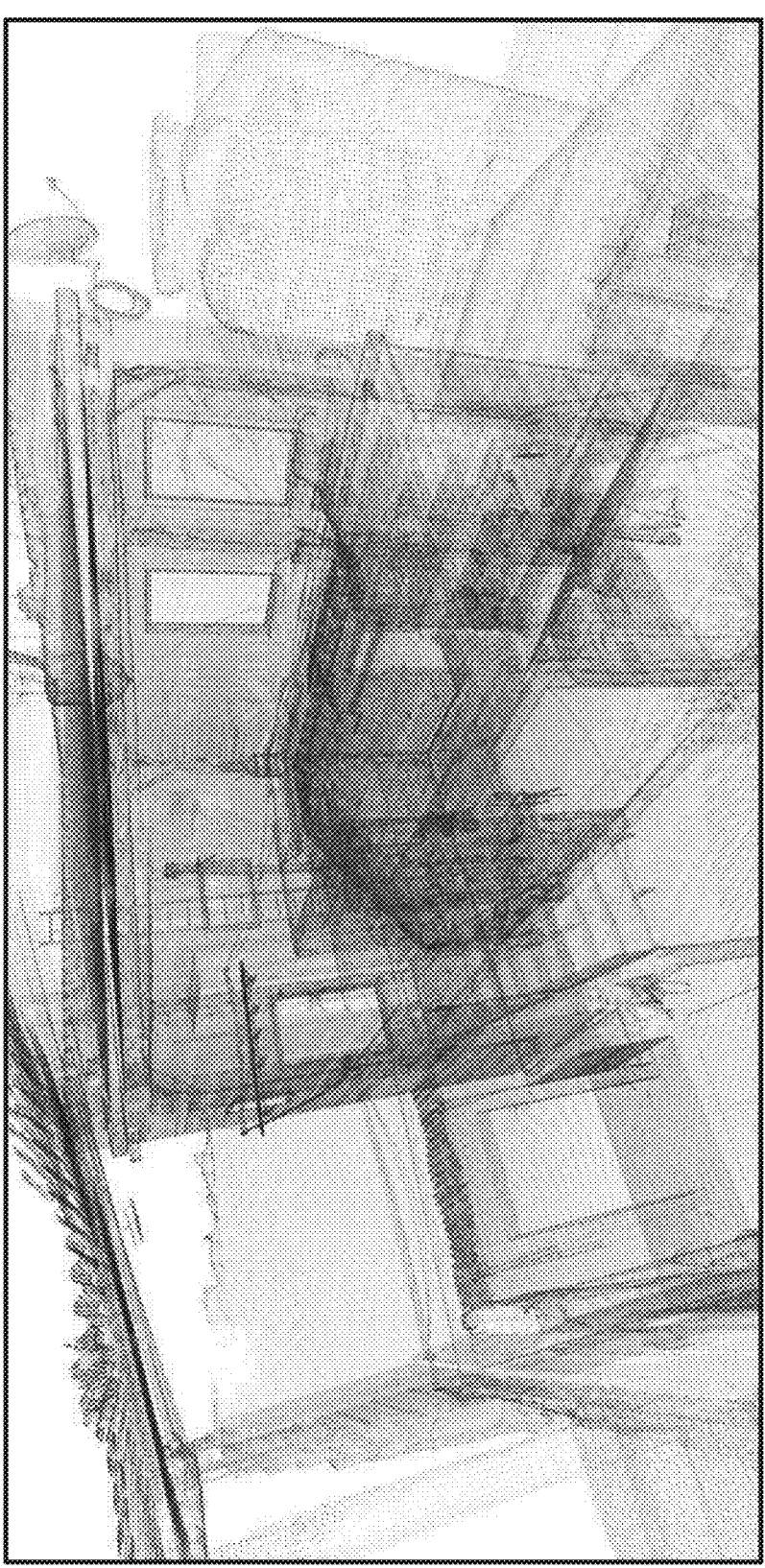
FIG. 5A is an image showing a collection of points in a point cloud, in accordance with one embodiment of the present specification.
Figure 5B:
FIG. 5B illustrates the input image that is used to generate the point cloud of FIG. 5A.

The point cloud is created from data structures associated with each of these points within the virtual landscape. FIG. 5A illustrates a first image 500A showing a collection of points in a point cloud, in accordance with one embodiment of the present specification. FIG. 5B illustrates the input image 500B that is used to generate the point cloud of FIG. 5A.

Figure 6:
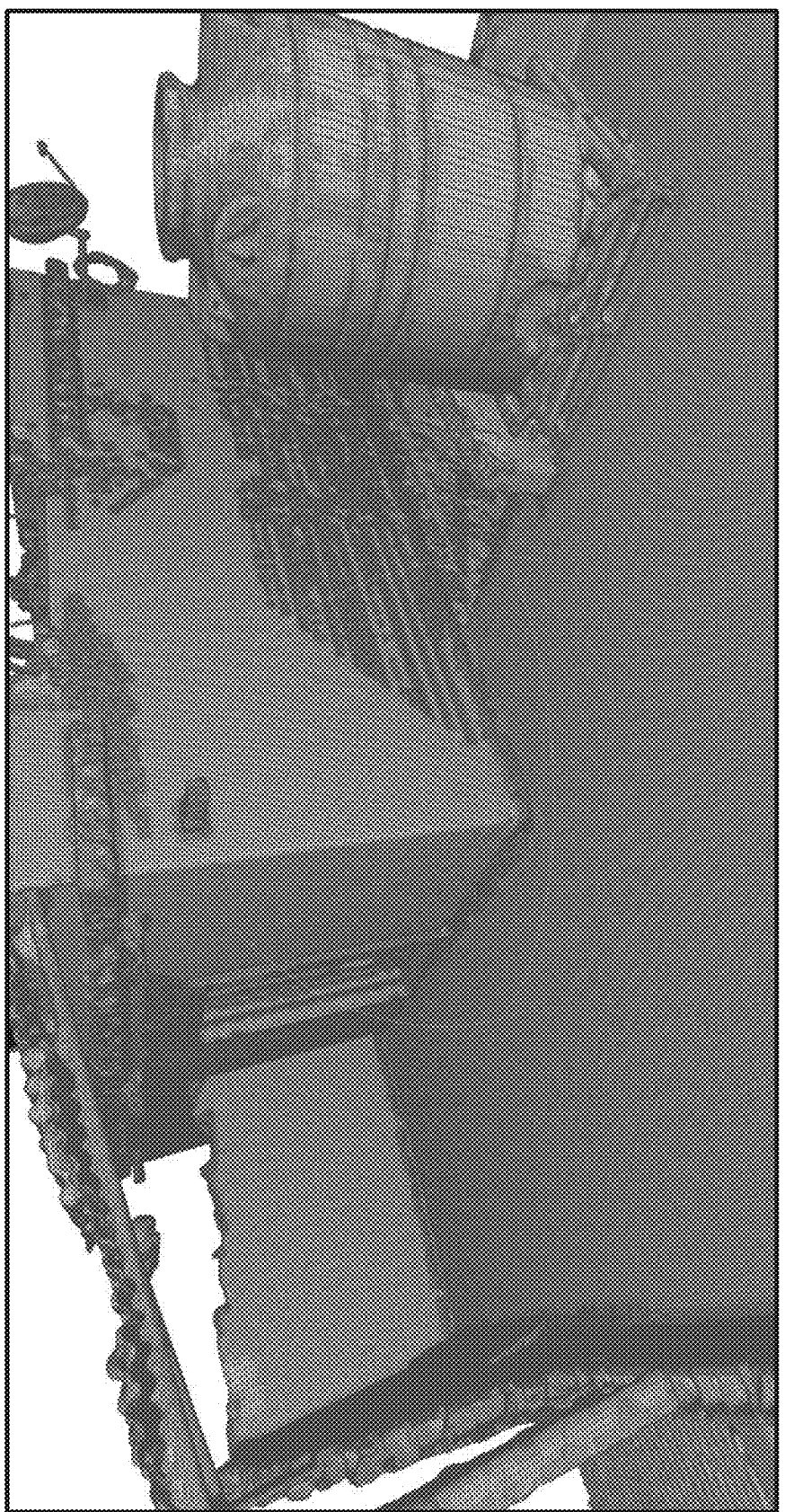
FIG. 6 is an exemplary image of an object or scene constructed from a triangular mesh that comprises approximately 12 million triangles, in accordance with an embodiment of the present specification.

Referring back to FIG. 2, at step 206, the data structures associated with each point in the point cloud are used to generate a mesh. In embodiments, the mesh is used to reconstruct the physical form of the original virtual space of the video game. Virtual space reconstruction from oriented points in the point cloud are cast in a spatial Poisson equation which considers all the points simultaneously. In alternate embodiments, different methods of surface reconstruction are used. The surface reconstruction approach generates a very dense mesh. In embodiments, the mesh is a combination of polygons that are connected to each other. In some embodiments, the polygons are triangular therefore creating a triangular mesh that is a collection of vertices, edges, and faces that describes a three dimensional (3D) virtual landscape. FIG. 6 is an exemplary illustration 600 of an object or scene constructed from a triangular mesh that comprises approximately 12 million triangles, in accordance with an embodiment of the present specification.

At step 208, the mesh is simplified to create a series of proxy meshes. It should be appreciated that the polygon mesh simplification is directed towards reducing the complexity of a mesh (number of polygons) while optimizing visual fidelity. In some embodiments, the simplification process involves creating texture coordinates for the mesh by using mesh parameterization. Texture coordinates are created using UV mapping, which involves projecting a two-dimensional (2D) image on a three-dimensional (3D) surface. The mesh parameterization process uses the mesh and connections of various polygons within the mesh. The process further analyzes the mesh to find which edge (and, with it, the associated multiple polygons) can be removed to create a smallest error. The process of finding the edge and removing to create the smallest error is repeated in order to simplify the mesh. The iterative process is continued until the simplified mesh is reduced to a predefined percentage of the original mesh polygons. The predefined percentage may be specified by, or is based on a value provided by, the content creator as the number of required polygons for the final mesh.

In an embodiment, a type of polygon identified in a mesh is a triangle, and a target triangle count for a simplified mesh is set to approximately 5000 triangles. The number of triangles in the simplified mesh can be adjusted to a different number (other than 5000) by a user, using the settings of each region that is simplified. If the geometry happens to be simple, the triangle count may be further reduced by the simplifier. In an embodiment, the distance metric used to calculate the number of polygons in a simplified mesh is the 'Hausdorff distance', also known as the 'Hausdorff metric'. The simplification of the mesh continues as long as the distance between the input and simplified meshes is less than a target threshold. The simplification of large meshes may take a long time, owing to the time it takes to measure large distances. In embodiments, the methods of the present specification reduce the measurement time, as the distance from a subset of point on the surface is approximated. Specifically, half of the points are chosen from the vertices with highest curvature, since these will tend to have a large effect on the result while the other half of the points are chosen from a uniform distribution over the surface of the mesh. Distance measurements of points are accelerated by the use of a spatial tree structure.

Additionally, the cost of reducing the mesh complexity may be far too high to perform after every edge collapse, because distances are measured over the entire mesh. Embodiments of the present specification enable reducing the mesh to a user-specified triangle (polygon) count, and then only measuring distances in percentage checkpoints. In an example, distances are checked only after every 5% reduction achieved.

Figure 5C:
FIG. 5C illustrates the image of FIG. 5B that has been simplified using the point cloud of FIG. 5A.

Texture coordinates for each polygon in the simplified mesh are identified. A predefined parameterization library may be used to create texture mapping coordinates for the simplified mesh. In embodiments, material textures are created by looking up data in the point cloud for the pixel's world position. In other words, each pixel within the texture is used to check and discover the simplified mesh polygon that it represents. The identified pixel is searched in the point cloud, so that data from the data structure associated with that point in the point cloud may be used. FIG. 5C illustrates a simplified version 500C of the image of FIG. 5B that has been simplified using the point cloud of FIG. 5A. The polygons from the simplified mesh may not necessarily fill up the texture, therefore the polygon is padded by interpolating from nearby points. In this way, the simplified proxy meshes are created that are representative of the material textures of various points in the point cloud.

In embodiments, the methods of the present specification are used to create a series, or a chain of proxy meshes. In an embodiment, two LOD meshes are created by executing the whole Group LOD process of FIG. 2 twice. The content creator is able to select, for each LOD, which input geometry should be used and is also able to set how many triangles (polygons) should be used for simplification.

In an alternative approach, each mesh may be simplified within a material or medium. According to the present specification, by combining the meshes to generate a new mesh that replaces all of the materials in different meshes with a single new material, the simplification is relatively more robust which also provides a more accurate rendering of the objects, since parts of the meshes can be removed where they overlap each other. It is advantageous to create a mesh for each material or medium within an object or article of clothing and then subsequently combine the meshes in a series or chain of proxy meshes (stitching meshes) to minimize artifacts.

At step 210, the proxy meshes are loaded at runtime according to the required LOD asset, by rendering module 134 (in data communication with a client-side rendering module or engine 134'). The module 134 selects an appropriate LOD asset at an appropriate switch distance in order to enable consistent visuals and performance for all gameplay scenes across platforms while ensuring optimal runtime efficiency in terms of, at least, predefined target GPU performance and memory usage. During runtime, the video game is played by one or more players participating in the game. During runtime, as a player moves closer to a target location, a proxy mesh naturally devolves into its underlying group of meshes corresponding to the target location. As the player moves further away from the target location, the group of meshes corresponding to the target location is replaced by the proxy mesh. The proxy mesh may be used to look up UV coordinates, obtain a texture mapping from the coordinates, and subsequently visually define the corresponding pixel. The pixel is then represented on the display where the video game is being rendered. Embodiments of the present specification therefore render one or more objects within virtual landscape of the game according to the required LOD based on proximity of a player to the one or more objects. In some embodiments, methods of the present specification are used to create combined meshes for groups of objects in LOD assets (herein also termed as group LOD) that are far away from the player such that much detail is not required. In some embodiments, methods of the present specification are used to create combined meshes in any situation such as for example where it is desirable to remove multiple materials. In one example, a hierarchical group LOD method and system is provided, in which a single mesh may be generated for a cluster of buildings, and as the player gets closer to the scene, each building may have its own mesh, and as the player is even more proximate to the scene, each building may be rendered normally, without simplification.

Embodiments of the present specification provide a key advantage of avoiding user or manual intervention in the form of coding to represent LODs for several objects in a virtual landscape. In some embodiments, if the proxy mesh is unable to provide a clear display of one or more objects, results of the proxy mesh (which are provided in bug reports) are overridden with a manually made mesh using conventional methods of generating LOD assets.

The above examples are merely illustrative of the many applications of the system of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A method of generating level of detail (LOD) visual assets of a virtual landscape for rendering in a video game, the method comprising:

creating a point cloud around a portion of the virtual landscape, wherein said point cloud comprises a plurality of data points and wherein each of the plurality of data points comprises a) data representative of a coordinate of said data point's location in world coordinates within the virtual landscape and b) data that defines at least one normal vector geometrically characterizing a tangential face to a pixel that would be rendered at the data point's location;

generating a mesh based on the point cloud; and simplifying the mesh to create a series of proxy meshes, wherein the proxy meshes are dynamically rendered during an execution of the video game and as the LOD visual asset changes for the portion of the virtual landscape.

2. The method of claim 1 wherein the creating the point cloud comprises placing one or more virtual imaging probes at least one location in the portion of the virtual landscape.

3. The method of claim 2 wherein a first set of virtual imaging probes are placed in one of a spherical and a hemispherical configuration around the at least one location.

4. The method of claim 2 wherein each of the one or more virtual imaging probes is configured to gather image data from the at least one location in the portion of the virtual landscape and wherein the gathered image data is saved to a data structure.

5. The method of claim 4 wherein said data structure is stored in a cloud.

6. The method of claim 1 wherein generating the mesh comprises applying Poisson reconstruction to the point cloud.

7. A computer readable non-transitory medium comprising a plurality of executable programmatic instructions wherein, when said plurality of executable programmatic instructions are executed by a processor in a computing device, a process for generating level of detail (LOD) of visual assets of a virtual landscape, for rendering in a video game, the plurality of executable programmatic instructions comprising:

creating, by an LOD management module, a point cloud around a portion of the virtual landscape, wherein said point cloud comprises a plurality of data points and wherein each of the plurality of data points comprises a) data representative of a coordinate of said data point's location in world coordinates within the virtual landscape and b) data that defines at least one normal vector geometrically characterizing a tangential face to a pixel that would be rendered at the data point's location;

generating, by the LOD management module, a mesh based on the point cloud; and simplifying, by the LOD management module, the mesh to create a series of proxy meshes, wherein the proxy meshes are dynamically rendered during execution of the video game and as the LOD visual asset changes for the portion of the virtual landscape.

8. The computer readable non-transitory medium of claim 7 wherein the creating of the point cloud, by the LOD management module, comprises placing, by the LOD management module, one or more virtual imaging probes at least one location in the portion of the virtual landscape.

9. The computer readable non-transitory medium of claim 8 wherein a first set of virtual imaging probes are placed, by the LOD management module, in one of a spherical and a hemispherical configuration around the at least one location.

10. The computer readable non-transitory medium of claim 8 wherein each of the one or more virtual imaging probes is configured to gather image data from the at least one location in the portion of the virtual landscape and save the gathered image data to a data structure.

11. The computer readable non-transitory medium of claim 10 wherein the data structure is a cloud.

12. The computer readable non-transitory medium of claim 7 wherein the generating of the mesh, by the LOD management module, comprises applying Poisson reconstruction to the point cloud.

13. A method of generating level of detail (LOD) visual assets of a virtual landscape, for rendering in a video game, comprising creating a point cloud around a portion of the virtual landscape by placing one or more virtual imaging probes in at least one location in the portion of the virtual landscape, wherein the method for placing one or more virtual imaging probes comprises:

assigning a value to each quad in a mesh;

creating a cube map by rendering six images, using a graphical processing unit (GPU), for a center point of all nodes in an octree that is not a leaf node;

checking, using the GPU, for values of zero for each pixel in the six images;

creating a node bit array list of bit arrays read back from the GPU;

creating a work bit array, wherein each bit in the work bit array is set to zero;

counting a number for set bits from the node bit array list where a corresponding bit in the work bit array is not set;

selecting a node with the largest counted value and for each of the bits that are set in the node bit array, setting the bits in the work bit array;

adding a center position of the selected node to a list of final node positions;

removing any nodes that do not have any corresponding bits set in the work bit array from the node bit array list; and generating a result in the form of a final nodes position list once all the nodes in the node list have been covered.

14. The method of claim 13, further comprising determining if there are nodes remaining in the node bit array list.

15. The method of claim 14, further comprising determining if a maximum allowed nodes in the final node list has been reached.

16. The method of claim 15 wherein the maximum allowed nodes is 300.

17. The method of claim 15, wherein if the maximum allowed nodes in the final node list has not been reached, repeating the method of claim 13.

18. The method of claim 13, wherein each value is a unique count beginning at 1.

19. The method of claim 13, wherein the rendered six images are one in each direction of a three-dimensional (3D) axis.

* * * * *